United States Patent [19]
Gurrey

[11] 3,884,190
[45] May 20, 1975

[54] RESILIENTLY EXTENSIBLE, COILED LEASH

[75] Inventor: Richard B. Gurrey, Long Beach, Calif.

[73] Assignees: Richard B. Gurrey; Hartley B. Gurrey, both of Palm Desert, Calif.

[22] Filed: Mar. 25, 1974

[21] Appl. No.: 454,404

[52] U.S. Cl. .............................................. 119/109
[51] Int. Cl. ............................................ A01k 27/00
[58] Field of Search .................. 119/109, 106, 96 R

[56] References Cited
UNITED STATES PATENTS

| | | | |
|---|---|---|---|
| 2,827,017 | 3/1958 | Ryan | 119/109 |
| 2,911,947 | 11/1959 | Kramer | 119/109 |
| 2,994,300 | 8/1961 | Grahling | 119/106 X |
| 3,096,741 | 7/1963 | Ollstein | 119/106 |

*Primary Examiner*—Louis G. Mancene
*Assistant Examiner*—J. N. Eskovitz
*Attorney, Agent, or Firm*—William W. Haefliger

[57] ABSTRACT

A self-coiling animal leash comprises music wire and a flexible sheath on the wire, the leash forming coils to be gripped by the handler.

7 Claims, 6 Drawing Figures

PATENTED MAY 20 1975 3,884,190
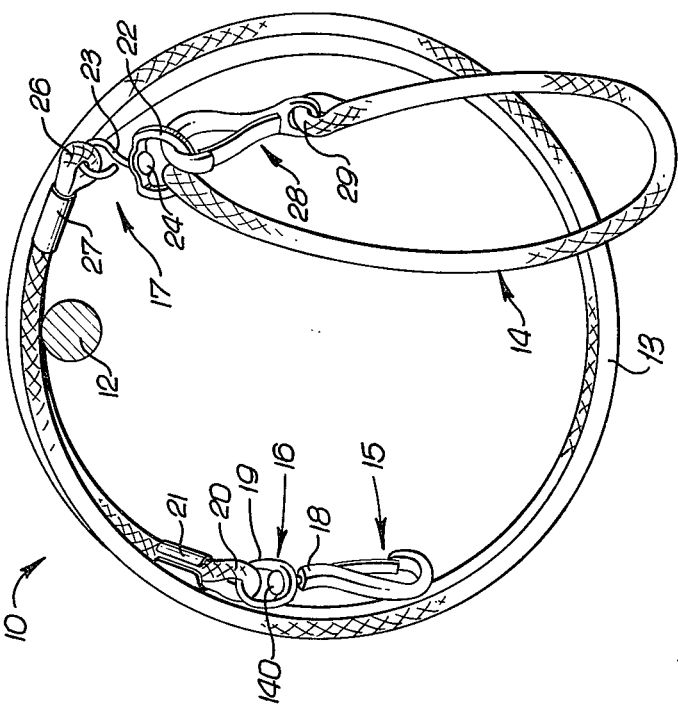
Fig. 1.
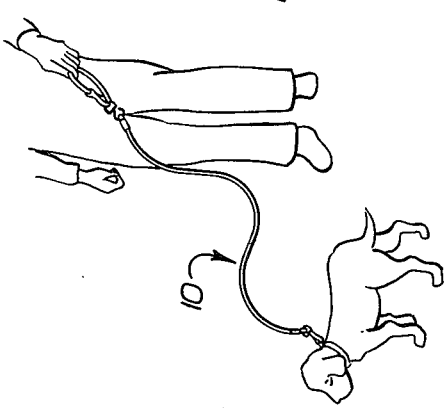
Fig. 2.
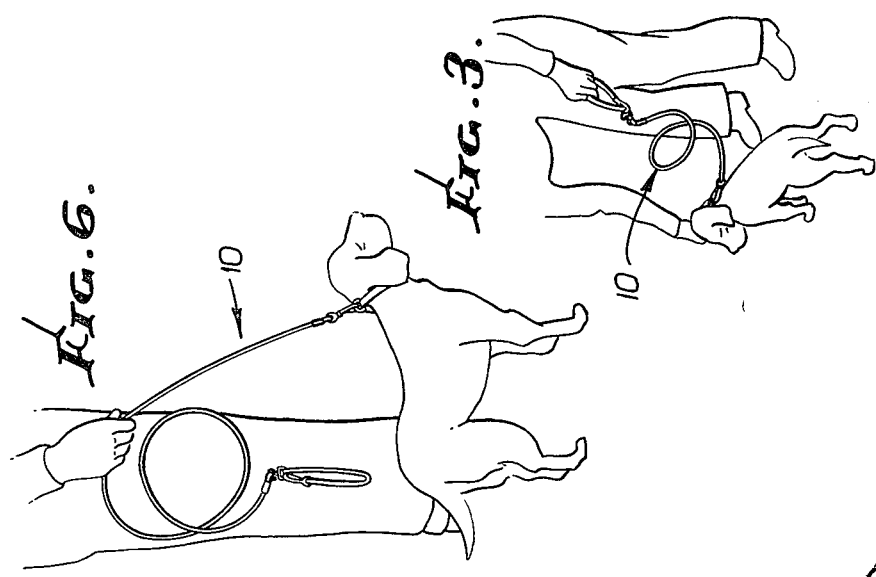
Fig. 3.
Fig. 6.
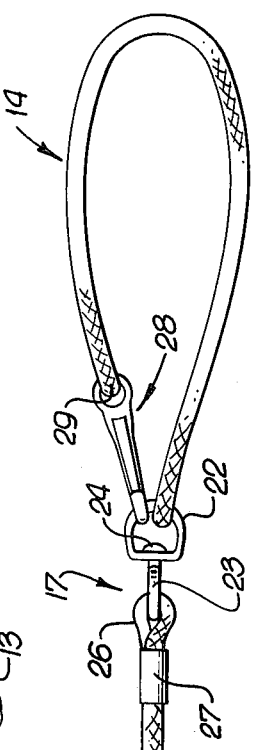
Fig. 5.
Fig. 4.

_3,884,190_

RESILIENTLY EXTENSIBLE, COILED LEASH

BACKGROUND OF THE INVENTION

This invention relates generally to the construction of leashes for pets, and more particularly concerns a leash of unusually advantageous lightweight, self coiling structural configurations.

Conventional leashes of various design embody a number of disadvantages. Among these are their tendencies to become entangled with a dogs legs, to wrap about a dog's neck, to drag in brush and weeds picking up such material, to drag on the ground, to suddenly jerk the dog at his collar upon becoming fully extended after offering almost no restraint as the dog starts to run; and to remain elongated when not in use, occupying too much space.

SUMMARY OF THE INVENTION

It is a major object of the invention to provide a leash of substantially improved construction, which will overcome the above disadvantages. Basically, it comprises:

a. a metallic wire which normally forms side-by-side coils at least about 5 inches in diameter, the wire also having an uncoiled, extended state when subjected to tensioning force application, and b. a sheath on the wire and characterized as sufficiently flexible so as not to inhibit formation of said coils.

As will be seen, the wire may consist of music wire, and the sheath may have loosely braided construction and consist of non-metallic, as for example plastic, fibers or strands so as to be conveniently hand held and also not impede self coiling of the leash. Further, swivel connections may be provided at handle and collar catch ends of the leash, for purposes as will appear.

These and other objects and advantages of the invention, as well as the details of an illustrative embodiment, will be more fully understood from the following description and drawings, in which:

DRAWING DESCRIPTION

FIG. 1 is a side elevation showing the leash in stored condition;

FIG. 2 is a view showing the leash in partly extended condition, in use;

FIG. 3 is a view like FIG. 2 but showing the leash in less extended condition, in use;

FIG. 4 is an enlarged elevation showing details of construction of the leash;

FIG. 5 is an enlarged cross-section on line 5—5 of FIG. 4; and

FIG. 6 is a view of a partly stored leash, in use.

DETAILED DESCRIPTION

The illustrated leash assembly 10 includes a metallic wire 11 which normally forms side-by-side coils at least about 5 inches in diameter, and preferably about 7 inches in diameter. This condition prevails when the wire assumes its unstrained or natural configuration, enabling efficient storage of the leash, as by suspension of the coils on a nail, hook or other protrusion 12 from a wall, as seen in FIG. 1. The wire may, with unusual advantage consist of tempered spring steel music wire, or equivalent, of a diameter between 0.040 and 0.060 inches, allowing ease of extension in use, (the wire not being stretchable when fully tensioned) by normal pull exerted by a pet such as a dog as seen in FIG. 2; on the other hand, the leash always tends to collapse toward coiled state, exerting a light pull on the pet so that it feels under control at all times, whether the leash is substantially extended as in FIG. 2 or only partly extended as in FIG. 3. Such pull should be less than about 8 ounces, to accommodate pets down to cat size, the above wire meeting this requirement.

The wire is loosely received in a protective sheath 13 characterized as sufficiently flexible so as not to inhibit either self-coiling, or stretching of the wire, as described; on the other hand, the sheath has a diameter of at least ¼ inch so as to be readily manually graspable, and to protect the user's hand from contact with the wire. For example, the sheath preferably has loosely braided formation, and consists of non-metallic fibers. One good example would be polypropylene fibers loosely braided to form a sheath having an overall diameter of about ¼ to ⅛ inch. Further, upon assembly, the sheath is typically compressed or partially collapsed endwise somewhat on the wire, to facilitate unimpeded coiling of the wire, an example being the one of a sheath having an initial net length of about 54 inches, and assembling it on a wire having a length of about 51 inches.

As is seen, a handle 14 is provided at one end of the leash, and a catch 15 at the opposite end of the leash; further, a swivel connection is provided as at 16 between the catch 15 and the sheath, and another swivel connection is provided as at 17 between the handle and the sheath. This construction facilitates uncoiling and coiling of the wire as the leash extends and collapses, with almost no restraint imposed on such coiling and uncoiling by the pet and the hand grasping the handle. Without such swivels, there would be undesirable restraint imposed.

In the example, the swivel connection at 16 includes catch ring 18 and swivel ring 19 interconnected by swivel 40, ring 19 coupled to end loop 20 formed by the sheath with wire therein. A few inches of the sheath end portion is looped through the swivel ring 19 and then returned back through the open weaving of the sheath and into the interior of the sheath, by means of a tool known as a fid. By this method, the wire which has been previously attached to the swivel ring is covered by the sheath. Crimped retainer sleeve 21 encompasses the loop, as shown.

The swivel connection at 17 includes swivel rings 22 and 23 interconnected by swivel 24. Ring 22 is coupled to handle 14, and ring 23 coupled to sheath end loop 26 formed by the sheath with wire therein. The sheath end passes back through itself as described above. Crimped retainer sleeve 27 encompasses the loop, as shown. The handle 14 may be formed of the same material as sheath 13, and may have another catch 28 attached to ring 22 to form a handle loop for convenient hand holding.

From the foregoing it is clear that:

The leash stays clear of the dog — it doesn't rest on his neck or back; it doesn't get entangled around the dog's legs; it doesn't get involved with long grass or weeds, or low shrubs, because it stays above the back of the animal; as the dog changes his pace, the leash automatically adjusts, i.e. it coils up short when he slows up and stretches out straight as he exerts pull. The leash never drops in contact with the ground — thus it stays clean. Also it is easy to slide one's hand along it, since it is stiff, and one may have a short leash hold on the dog for maximum control in times of necessity, as when handling an animal on a crowded sidewalk, crossing a street or in an elevator. The unused part of the sheath not under tension automatically coils itself in back of the handler's grip-point, as in FIG. 6, i.e. off the ground and free of entanglement and dirt. The leash tends to carry direction communication clearly to the animal without the necessity of jerking, providing a positive and continuous signal from handler to dog, and also from dog to handler who is thereby alerted to an unexpected movement of the dog. When snapped off the animal's collar, it immediately coils into its original form which is easy to carry over the arm, as a bracelet, leaving one's hand free for another function. The possibility of snapping the "loop end" around a post or small tree or chair leg etc., enlarges the use of the leash to keep the dog under control when it is not convenient to hold the leash, (when in a market or store, sunning in the park, talking to a friend, etc.). Finally, the leash's coiling "memory" causes it always to re-form and remain in a neat coil when not in use, thus keeping it in useable order when hung on a hook, placed on a table, left on a car seat, etc.

FIG. 3 also shows the partly coiled condition of the leash, when the dog is not pulling ahead, as for example when the dog has stopped or returned part way toward the handler. Note the fact that the leash does not drag on the ground.

I claim:

1. In an extensible leash assembly,
  a. a metallic wire which normally in untensioned state and throughout its length forms side-by-side coils at least about 5 inches in diameter, the wire also having an uncoiled, extended state when subjected to tensioning force application, the leash in fully extended state being less than about 60 inches in length,
  b. a sheath on the wire and characterized as sufficiently flexible so as not to inhibit formation of said coils, and
  c. a handle at one end of the leash, and a catch at the opposite end of the leash, a swivel connection between said catch and the wire at said opposite end of the leash, and another swivel connection between said handle and the wire at said one end of the leash.

2. The assembly of claim 1 wherein said wire consists of music wire.

3. The assembly of claim 1 wherein said sheath has loosely braided formation and consists of non-metallic fibers.

4. The asembly of claim 3 wherein said sheath is generally tubular and has an outer diameter of at least ¼ inch.

5. The assembly of claim 4 wherein the sheath is assembled on the wire in endwise compressed state to facilitate coiling of the wire.

6. The assembly of claim 1 wherein said wire is characterized as extensible to said state in response to endwise force application of less than about 8 ounces.

7. The assembly of claim 1 wherein the swivel connections include swivel rings, the sheath forming end loops connected with the swivel rings.

* * * * *